United States Patent
Turner

[15] 3,670,452
[45] June 20, 1972

[54] TURKEY CALL

[72] Inventor: William A. Turner, 205 Sycamore Road, Franklin, Va. 23851

[22] Filed: March 19, 1971

[21] Appl. No.: 126,047

[52] U.S. Cl. .................................................. 46/178, 46/181
[51] Int. Cl. ................................................................ A63h 5/00
[58] Field of Search ..................................... 46/178, 179, 181

[56] References Cited

UNITED STATES PATENTS 1,528,523  3/1925  Beck........................................46/181
1,576,099  3/1926  Dessau.....................................46/181

Primary Examiner—Louis G. Mancene
Assistant Examiner—Robert F. Cutting
Attorney—J. Maxwell Carson, Jr.

[57] ABSTRACT

A turkey call including a tubular stem element formed of hard plastic and having a rounded end as well as including a hard plastic bell element integrally interconnected with the other end of the stem element; the hollow interiors of the stem element and the bell element of the call being in communication. A reinforcing shoulder element is externally integrally provided at the point of connection of the stem and bell elements of the turkey call.

1 Claim, 3 Drawing Figures

INVENTOR.
WILLIAM A. TURNER

BY J. Maxwell Carson, Jr.
ATTORNEY

TURKEY CALL

This invention relates generally to a wild turkey call, and more particularly to a device of this type formed of a non-metallic material to produce a sweeter sound.

The hunting of wild turkeys as highly desirable food items has been carried on in the areas now included within the United States of America and elsewhere for centuries. The early settlers from Europe who colonized these areas found that the native inhabitants thereof hunted wild turkeys by utilizing a call formed of the dried small wingbone of a turkey from which the marrow had been removed with which the "peep" of the hen bird was imitated to attract gobblers; a "sucking" or "kissing" sound being made with one end of the call at the lips and the cupped hands being utilized at the other end of such a call to amplify the sound so reproduced. Although many turkeys have been called up closely enough to be taken by hunters of both native and European stock using such a device and method during the ensuing years, it has been considered by hunters using such a call that the sound produced therewith falls short of being realistically imitative of the "peep" of a hen turkey, and through the years efforts have been made to improve such a call in this respect. The turkey call forming the subject matter of the present application is a result of such efforts, and is considered to adequately meet a need not heretofore satisfied by any known prior art devices in this field in that a quite realistic imitation of the sound made by a turkey hen may be produced therewith, which would be of material benefit to those engaged in the hunting of the wild turkeys now quite abundant in many areas as a result of the successful application of the expanded knowledge of the range, food, and shelter requirements of these birds by government game management personnel in breeding and stocking programs.

Accordingly, an object of the present invention is the provision of an inexpensive, simple, and rugged wild turkey call useable to realistically imitate the "peep" of a hen turkey.

Another object of the instant invention is the provision of a turkey call formed of a non-metallic material with which the sound made by a hen turkey may be more sweetly and realistically imitated.

According to the present invention, the foregoing and other objects are obtained by providing a turkey call including a tubular stem element formed of a hard plastic material; one end of which is somewhat rounded and positionable at the lips of the user of the call. The turkey call further includes a substantially conical bell element also formed of a hard plastic material and integrally interconnected with the other end of the stem element; the hollow interior of the bell element communicating with the hollow interior of the stem element. A reinforcing and strengthening shoulder element is integrally circumposed about the point of interconnection of the stem and bell elements of the turkey call.

A more complete appreciation of the invention and many attendant advantages thereof will be readily apparent as the same becomes better understood by reference to the following detailed description when considered in connection with the accompanying drawing wherein.

Figure 1:
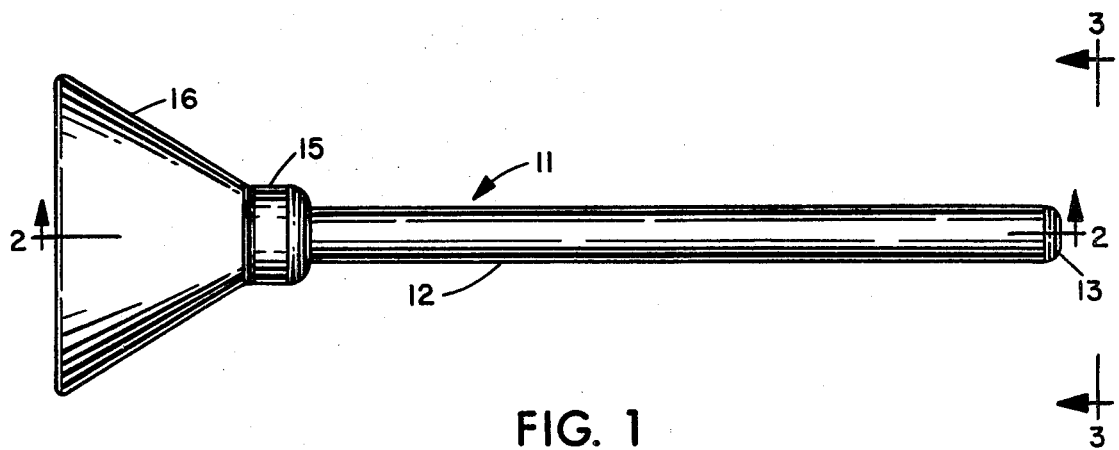
FIG. 1 is a side elevational view of the turkey call according to the instant invention.
Figure 2:
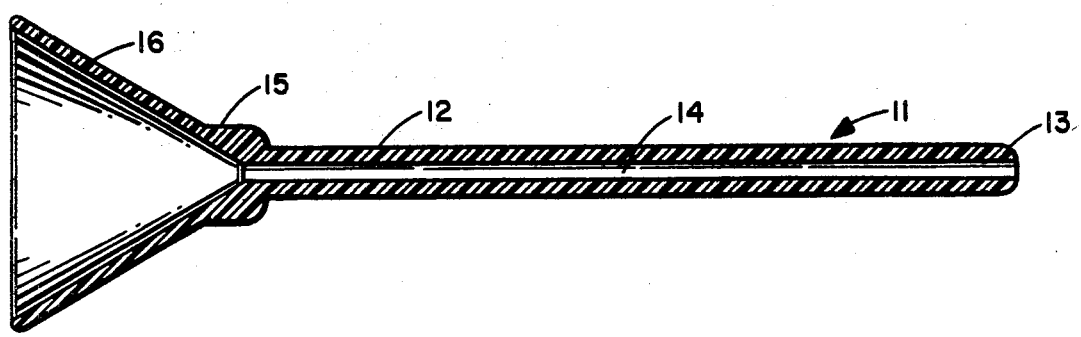
FIG. 2 is a sectional, elevational view thereof taken on the line 2 — 2 of FIG. 1.
Figure 3:
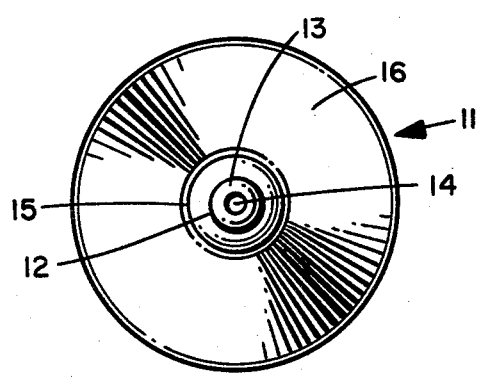
FIG. 3 is an end elevational view thereof, taken on the line 3 — 3 of FIG. 1.

Referring now more particularly to the drawing, wherein like reference numerals designate the same or identical parts throughout the several views, there is shown a wild turkey call, generally designated by the reference numeral 11. Turkey call 11 includes an elongated, cylindrical stem element 12 formed of a hard plastic material and having a rounded end 13 adapted to be comfortably placed against the lips of the user of the call 11; the stem element 12 being provided with a centrally disposed bore 14 extending longitudinally therethrough from end to end thereof. In practice, it has been found that the length of the stem element 12 of the turkey call 11 should be in the range of from 3 inches to 6 inches, and that the bore 14 formed therethrough should be from 1/8 inch to 3/16 inch in diameter, with the thickness of the cylindrical wall of the stem element 12 being about equal to the diameter of the bore 14 formed therethrough.

Turkey call 11 also includes a reinforcing and strengthening shoulder element 15 circumposed about the end of the stem element remote from the end 13 thereof at the point of interconnection of a substantially conical bell element 16 with the stem element 12. The bell element 16 of the turkey call 11 is made of the same hard plastic material as the stem element 12 thereof; these two elements of the call 11 being integrally joined each to the other. The bell element 16 of the turkey call 11 has a conically shaped wall having a thickness somewhat less than the thickness of the cylindrical wall of the stem element 12 of the call 11; the hollow interior of the bell element 16 of the call 11 being in fluid communication with the bore 14 extending longitudinally through the stem element 12 thereof. In practice, it has been found that the bell element 16 of the call 11 functions very well to obtain the contemplated results when made with a length of about two inches and with a maximum diameter of about two inches. The shoulder element 15 of the turkey call 11 projects forwardly from the stem element 12 thereof to also extend about the apex portion of the bell element 16 thereof; the shoulder element 15 being formed integrally with the stem element 12 and the bell element 16 to reinforce the turkey call 11 at the junction of these two elements thereof. The shoulder element 15 is made thick enough to withstand the continuous flexing that the turkey call 11 will experience at the location thereof as it is carried in a hunting coat pocket, and thereby assures the provision of a turkey call strong and durable enough to withstand years of hard wear.

When the user of the turkey call 11 reaches the location to which he desires to attract wild gobblers, he may remove the call 11 from his pocket and, holding the same by the stem element 12 thereof, set the rounded end 13 of the stem element 12 against his lips. He may then make a "sucking" or "kissing" sound. This sound moves down the bore 14 formed through the stem element 12 of the turkey call 11 and then through the bell element 16 thereof; the sound being amplified by the bell element 16 of the call 11 to carry a considerable distance. This sound is remarkably similar to the "peep" of a hen turkey; the non-metallic construction of the turkey call 11 imparting to the same a quite realistic sweetness considered to be singularly appealing to a wild gobbler. This sound is repeated until a wild gobbler answers the same and is continued as the turkey moves towards the source thereof. When close enough, the bird may be taken by the hunter, who may then continue the use of the turkey call 11 in this manner to further attract other male birds.

Obviously, certain modifications and variations of the present invention are possible in the light of the foregoing teachings. It is therefore to be understood that within the scope of the appended claim the invention may be practiced otherwise than as specifically described.

I claim:

1. A turkey call formed of a hard plastic material, comprising:
    an elongated, cylindrically shaped stem element having a first end rounded off and thereby adapted to be comfortably positioned against the lips of a user of said call as well as having a second end, said stem element being provided with a substantially centrally disposed and unobstructed bore longitudinally formed therethrough and extending between said ends thereof said bore being of uniform cross sectional area along the length thereof;
    a substantially conically shaped bell element having an apex portion integrally interconnected with said second end of said stem element, said bell element having a substantially conical wall and a hollow interior in fluid communication with said bore longitudinally extending through said stem element; and a shoulder element formed integrally with said stem element and said bell element and externally extending about said second end of said stem element and said apex portion of said bell element to strengthen and reinforce said turkey call at the line of juncture of said stem element and said bell element.

* * * * *